April 9, 1957

E. O. RUHLIG 2,788,443

SHIFT REGISTER CIRCUIT

Filed Oct. 23, 1953

INVENTOR
E. O. RUHLIG DECEASED
ARTHUR J. RUHLIG
HIS ADMINISTRATOR

BY [signature]
ATTORNEY

United States Patent Office 2,788,443

Patented Apr. 9, 1957

2,788,443

SHIFT REGISTER CIRCUIT

Earl O. Ruhlig, deceased, late of Summit, N. J., by Arthur J. Ruhlig, administrator, Clinton, Md., assignor to Bell Telephone Laboratories, Incorporated, New York, N. Y., a corporation of New York Application October 23, 1953, Serial No. 388,031

8 Claims. (Cl. 250—27)

Figure 1:
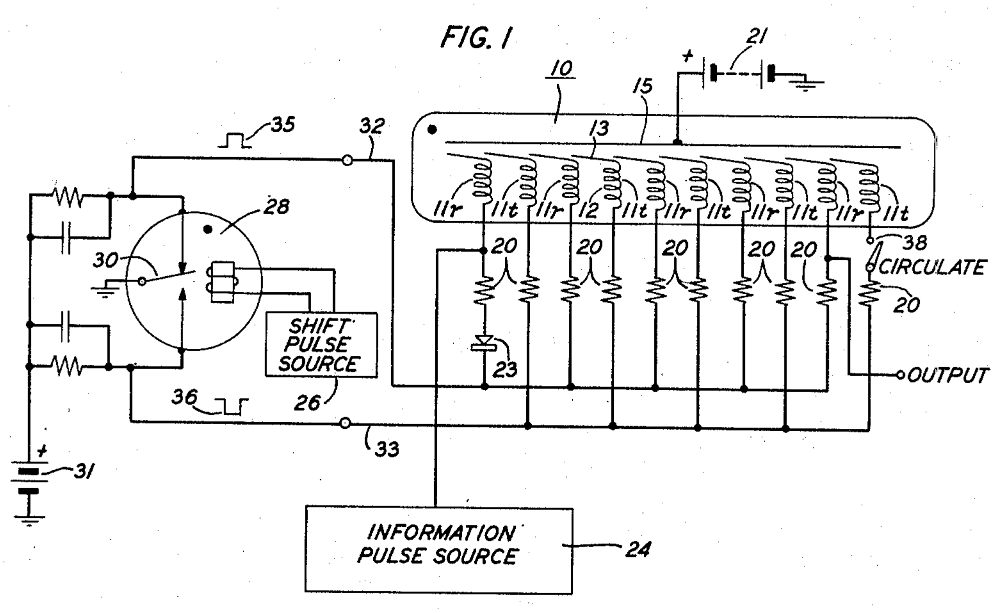

This invention relates to electrical circuits and more particularly to such circuits known as shift register circuits.

In a binary shift register circuit a row of binary storage elements is utilized and a particular sequence of binary digits registered in these elements, the sequence corresponding to some information message that is to be stored for subsequent employment in the system in which the shift register circuit is incorporated. The shift register circuit operates in response to shift signals or pulses, which are generally applied at equally spaced time intervals, so that subsequent to the application of the shift signal a digit is registered in each storage element next adjacent the storage elements where a digit had priorly been registered and no digit is registered in those storage elements next adjacent the storage elements where priorly no digit had been registered. Thus there must be both an erasure of priorly stored information and the storage of new information in each storage element upon occurrence of the shift signal.

Priorly various circuit components have been employed as the storage elements in the shift register, such components particularly including vacuum tubes and cold cathode tubes. However, the requirement of the simultaneous erasure and storage of information at each tube has caused shift register circuits employing individual tubes as the storage elements to be relatively complex and utilize a large number of additional circuit components, particularly such components as condensers, diodes and resistors. Further, there are limitations on the rapidity at which the pattern of digits representing the information message can be shifted along the register.

It is an object of this invention to provide an improved shift register circuit.

More specifically, objects of this invention are to provide a shift register circuit employing only a single tube, to reduce the number of circuit components required for a shift register circuit thereby simplifying the circuit configuration, and to increase the speed at which information may be shifted along the circuit.

A still further object of this invention is to provide a shift register circuit utilizing a multicathode stepping tube.

These and other objects of this invention are attained in specific illustrative embodiments of this invention wherein a shift register circuit comprises a stepping tube having a plurality of stages aligned in an array, each stage comprising a pair of cathodes and each cathode having a preference mechanism for preferential transfer of a discharge along the array. In accordance with an aspect of this invention, discharges may be present simultaneously at any of the stages and specifically at one of the cathodes of any of the stages, these discharges being present at these rest positions in accordance with the information stored in the shift register circuit. Thus the pattern of conducting and non-conducting rest positions establishes the pattern to be shifted along the register circuit, the condition at any one rest position being independent of the condition at all other rest positions.

When a shift signal is applied to the circuit, two pulses are simultaneously applied to the cathodes of the stepping tube. These two pulses are a positive extinguishing pulse applied to the rest cathodes of each stage to extinguish conduction if present at any rest cathode and a negative going pulse applied to the second or transfer cathode of each stage to cause conduction to appear at the transfer cathode of each stage whose rest position has been priorly conducting. On release of the shift signal these two pulses are removed and conduction present at any transfer cathode will transfer to the rest position or cathode of the next stage of the shift register circuit due to the preference mechanism incorporated into the stepping tube.

Thus when a shift pulse is applied, the condition existing at any stage, whether conduction or non-conduction, is shifted to the next stage and therefore once a pattern has been established in the shift register circuit, each succeeding shift signal shifts the pattern by one step in a forward direction along the array of stages.

Prior circuits employing gaseous discharge tubes or devices having a plurality of gaps have not been capable of operating as shift register circuits as the condition existing at any of these gaps has been dependent on and related to the condition existing at all other gaps. Thus in certain of these circuits, a discharge or glow established at a first gap has spread to other gaps, the total glow or discharge current thus increasing in response to each stepping pulse. In other of these circuits, a single discharge has been stepped from one cathode position to the next, the occurrence of a discharge at any position requiring that any other discharges present in the tube be extinguished. Therefore, whether because conduction at any gap has been dependent on the presence of conduction at all preceding gaps or on the absence of conduction at other gaps, it has not priorly been feasible to step a pattern of coexisting and independent discharges along an array of stages, as is required in a shift register circuit.

It is a feature of this invention that a shift register circuit comprise a single multicathode stepping tube having a plurality of stages positioned in an array and in which conduction may be present at any of the stages independent of the condition at any other stages, the pattern of conduction and non-conduction at the various stages corresponding to the information being shifted in the register circuit.

It is a further feature of this invention that each stage of the register circuit comprise a pair of cathodes each having a preference mechanism associated therewith so that conduction when present is shifted in a particular direction along the array, the two cathodes of each stage comprising a rest position at which the conduction may be present in the absence of a shift signal and a transfer position at which conduction may be present during the shift signal.

It is a still further feature of this invention that a pair of pulses be applied substantially simultaneously to each stage in response to a shift signal, these pulses comprising a positive extinguishing pulse applied to the rest position of each stage and a negative going pulse applied to the transfer position of each stage.

Figure 2:
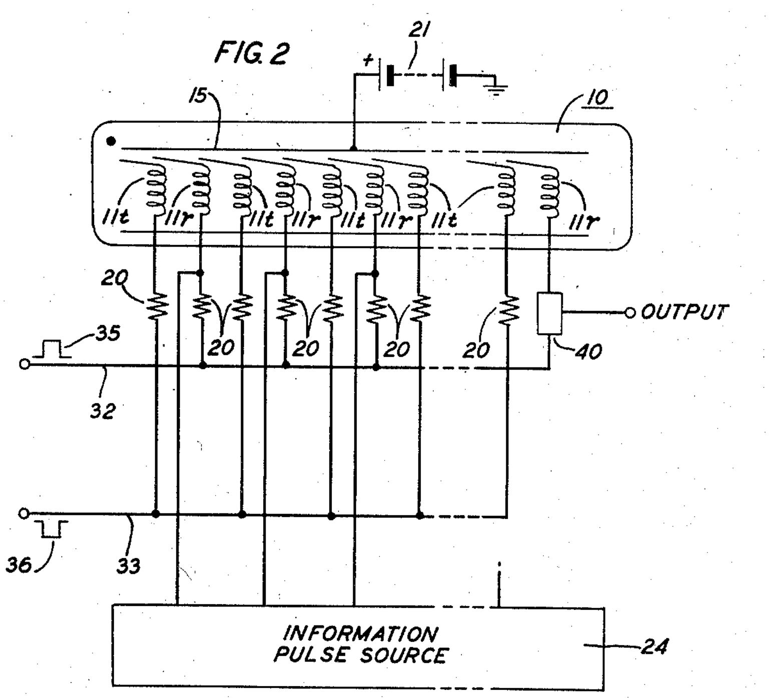

A complete understanding of this invention and of these and other features thereof may be gained from the following description and the accompanying drawing, in which:

Fig. 1 is a schematic representation of one specific illustrative embodiment of this invention; and Fig. 2 is a partial schematic representation of another specific illustrative embodiment of this invention.

Turning now to Fig. 1 of the drawing, there is depicted one illustrative embodiment of this invention wherein the shift register circuit comprises a cold cathode stepping tube 10 of known structure such as disclosed in M. A. Townsend Patent 2,575,370, issued November 20, 1951, or M. A. Townsend Patent 2,682,015, issued June 22, 1954. The stepping tube contains a number of cathodes 11 each having a preference mechanism, as is known in the art, so that the discharge will be stepped or transferred in a preferred direction along the row of cathodes. The cathodes 11 are diagrammatically depicted as being formed each from a single wire so as to have a helically coiled high efficiency discharge portion 12 and a low efficiency discharge portion 13, as disclosed in M. A. Townsend Patent 2,627,053, issued January 27, 1953, the low efficiency wire 13 of one cathode 11 extending over the high efficiency portion 12 of the preceding cathode 11 and between it and an anode 15 to improve the transfer characteristics, as disclosed in the above-mentioned Patent 2,682,015. While the cathodes 11 are depicted in Fig. 1 as being mounted in a straight row, this depiction is for purposes of illustration only and it is to be understood that the cathodes may preferably be mounted in a circle so that a discharge may be continuously circulated along the row of cathodes.

The cathodes 11 are divided into two groups, identified as cathodes **11*t* and 11*r* and corresponding to the transfer and rest cathodes of the above-identified application and patents, and each cathode 11 is connected externally to individual resistors 20. The anode 15 is connected to a voltage source 21 so that any or all of the gaps between the anode 15 and the cathodes 11*r*** can be made simultaneously conducting.

In the operation of the circuit depicted in Fig. 1, pulses are applied to the first cathode **11*t* across its resistor 20 which has a diode 23 connected in series to it to prevent passage of the storage pulses back to the other circuit elements. Let us assume that by applying pulses from the pulse source 24 a pattern of discharges has been established, in a manner to be described below, such that a discharge exists at each of the first, second, and fourth rest cathodes 11*r*** simultaneously but no discharge exists at the third and fifth rest cathodes or at any of the transfer cathodes. In accordance with this invention, when a shift pulse is applied to the circuit, each existing discharge or digit is stepped along the row by one stage, so that the entire pattern is shifted, in the manner common to shift register circuits.

In the specific illustrative embodiment of this invention depicted in Fig. 1, shift pulses are applied from a source 26 to the winding of a relay 28, which may advantageously be a mercury switch of the types disclosed in E. T. Burton Patents 2,459,306, issued January 18, 1949, and 2,577,602, issued December 4, 1951. Normally the movable contact 30 of the relay 28 applies ground potential to each of the rest cathodes **11*r* enabling the discharges to be maintained at these cathodes. A positive voltage, such as 67.5 volts, is applied from a source 31 to each of the transfer cathodes 11*t*. The relay is shown in this normal or unoperated position. When the shift pulse is applied to the relay, the movable contact 30 transfers and applies ground to the transfer cathodes 11*t* through lead 33 and a positive voltage to the rest cathodes 11*r* of each stage of the shift register through lead 32**.

Thus in effect a positive pulse 35 is applied to each of the rest cathodes to extinguish the discharge that may be present at any of them, as at the first, second, and fourth cathodes in our assumed pattern, and a negative going pulse 36 is applied to the transfer cathodes to cause the discharges priorly present at the rest cathodes of the first, second, and fourth stages now to step to the transfer cathodes of those stages. The discharges will remain at these cathodes **11*t* until the shift pulse is removed at which time the relay 28 releases and the discharges are stepped to the rest cathodes of the next succeeding stage, as these rest cathodes are now effectively going negative while the transfer cathodes are going positive. Therefore, in response to the single shift pulse, the pattern of independent discharges priorly existing at the first, second, and fourth stages has been shifted one stage now to be present at the second, third, and fifth stages. If desired, an output may be obtained across the individual resistor 20 of the fifth rest cathode, as shown, or from any of the rest cathodes of the tube. Further, by closing a circulate switch 38** connected to the last transfer cathode, the pattern of discharges may be shifted indefinitely around the tube.

A pattern is initially applied to the tube by the information pulse source which applies information storage pulses to the rest cathode **11*r*** of the first stage. The discharge thus established is shifted in response to successive shift pulses. By applying information storage pulses or not in the intervals between successive shift pulses, any desired pattern can be established in the tube and that pattern shifted as described above.

The extinguish and transfer pulses 35 and 36 are applied substantially simultaneously to the cathodes **11*r* and 11*t*, respectively. In any shift register circuit two problems must be considered in shifting the pattern; these problems are losing the pattern entirely during the shifting procedure and having the pattern run away resulting either in completely filling up the register or in multiple transfers in response to a single shift signal. In a circuit in accordance with this invention, if the voltage level on both leads 32 and 33 is positive at any time, there is the danger of losing the pattern while if the voltage on both leads 32 and 33** is negative, or ground, at any time, there is the danger of multiple transfers. However, within certain limits these conditions may be tolerated.

This may be better understood from consideration of the possible occurrences. If the extinguishing pulse 35 occurs first, so that the voltage level on lead 32 rises, in the embodiment described, to 67.5 volts while the voltage level on lead 33 remains at that voltage, the circuit will still operate properly provided that the transfer pulse 36 is applied within an interval such that the ionization present at the priorly conducting gap is still sufficient to establish a preferential breakdown of the next succeeding gap. This interval will thus be related to the deionization time of the tube which is dependent on such factors as the gap length, gas filling, and pressure, as is known in the art. For example, if hydrogen or hydrogen mixtures are employed as the gas filling this permissive time interval is so short that a mercury relay may not have a sufficiently fast operate characteristic for its utilization in circuits in accordance with this invention, due to bridging of the contacts and other operate properties of the relays. With such a gas filling, faster and more positive acting pulse generation circuits must be employed, such as vacuum tube multivibrator or flip-flop circuits. However, for gas fillings such as neon this permissive time interval is longer and therefore the bridging of the relay contacts is immaterial. This characteristic of the circuit is due to the fact that the residual ionization in the gap on extinction of the conduction at a cathode **11*r*** is the storage element of circuit, and the information thus stored in this storage element must be utilized in the operation of the circuit within the storage time of the storage element.

If the voltage level on lead 32 remains positive after the voltage on lead 33 returns to its positive level, i. e., if pulse 36 terminates before pulse 35, the discharge will have transferred from the cathode **11*t* to the cathode 11*r* of the next stage and then be extinguished at that stage. It can be reestablished at that stage if the pulse 35** ends before the deionization of the gap has progressed to the point at which a discharge will not be reestablished on return of the sustaining voltage across the gap. These are merely the considerations involved in momentarily extinguishing a discharge across any gap and then re-establishing that discharge by reapplying the sustaining, rather than the breakdown, voltage.

If the voltage level on lead 33 drops to a negative value, or ground in the specific embodiment described above, while the voltage on lead 32 is still at its negative value, or ground, the discharge will spread from a cathode 11*r* to the next adjacent cathode 11*t* and still remain at the prior cathode 11*r*. The current flowing through the resistance 20 of the prior cathode 11*r* assures that that cathode is more positive than the next adjacent cathode 11*r* in the row where we shall assume no discharge to be present in this particular pattern. Due to the voltage difference thus existing, the discharge will transfer from the cathode 11*t* to this next cathode 11*r*, and may in fact, if the voltage on lead 33 remains at its negative value, run down the row of cathodes. Pulse 35 should therefore be applied before the discharge has time to transfer from the cathode 11*t* to the cathode 11*r* as described above. This time interval of a permissive lag of the application of pulse 35 behind pulse 36 is thus dependent on the transfer times of the cathodes 11. If the voltage on lead 33 remains at its most negative value after the voltage on lead 32 returns to its most negative value, there is again the possibility of false shifting of the discharges in the pattern registered in the conducting and non-conducting gaps.

It is therefore to be understood that the substantial simultaneity of the application of the pulses 35 and 36 is such as to be within the limits, as described in the preceding paragraphs, for the particular tube 10 employed.

Turning now to Fig. 2, there is depicted a portion of a shift register circuit illustrative of another specific embodiment of this invention. In this embodiment the stepping tube 10 is depicted as having a plurality of cathodes 11 defining *n* stages of the shift register, there being thus *n* cathodes 11*t* and *n* cathodes 11*r*. In this embodiment, the pattern of discharges in the tube 10 is established by the simultaneous application of information pulses from the pulse source 24 across the resistors 20 of the rest cathodes 11*r* rather than by the serial application of a succession of pulses as in the prior embodiment. As described above, in accordance with an aspect of this invention the pattern is shifted by the substantially simultaneous application of the positive and negative going shift pulses 35 and 36, the positive pulse extinguishing the discharge at the cathodes 11*r* and the negative going pulse establishing the discharge at the next primed cathode 11*t*. An output device 40 may be associated with the last cathode 11*r* of the row to send out a signal which, if desired, can be transmitted to another similar circuit to re-establish the pattern; thus this output may serve as the information pulse source of the circuit of Fig. 1. Various means of obtaining the output pulse may be utilized including an auxiliary anode within the tube 10 arranged to have a breakdown preference when a particular cathode is conducting, as disclosed in M. A. Townsend Patent 2,635,810, issued April 21, 1953, by taking the output from across a load resistor, as depicted in Fig. 1, or in other ways known in the art.

It is further to be understood that various components for generating the input and shift pulses may be employed in the practice of this invention provided that the negative going extinguishing pulse 36 and the positive pulse 35 are applied substantially simultaneously to the cathodes 11*r* and 11*t*, respectively, as discussed above. Thus the above described arrangements are merely illustrative of the application of the principles of the invention. Numerous other arrangements may be devised by those skilled in the art without departing from the spirit and scope of the invention.

What is claimed is:

1. A shift register circuit comprising a cold cathode stepping tube having a plurality of stages of cathodes arranged in spatial series and anode means common to said cathodes, said stages comprising pairs of adjacent cathodes and said cathodes having preference means associated therewith for the transfer of a glow discharge preferentially in one direction along said series, means connected to at least one of said stages for applying information pulses thereto to establish a pattern of independent discharges at said stages, and means for shifting said pattern, said shifting means including means for substantially simultaneously applying positive and negative going pulses to alternate cathodes of said stages to extinguish any discharges present at said stages and to establish discharges at the stages next adjacent those stages where a discharge had been extinguished on release of said positive and negative going pulses.

2. A shift register circuit comprising a cold cathode stepping tube having a plurality of cathodes and a single anode common to said cathodes, said cathodes comprising a first and a second group alternately arranged in spatial series and each including preference means for the preferential transfer of a glow discharge in one direction along said series, each pair of cathodes in said series comprising a stage of the register circuit, means connected to at least one cathode of said first group for applying information pulses thereto to establish a pattern of independent discharges at said stages, and means for shifting said pattern along said stages, said shifting means including means for substantially simultaneously applying to said first group of cathodes a positive pulse to extinguish discharges present at said cathodes of said first group and applying a negative going pulse to said second group of cathodes to transfer discharges present at any of said first group of cathodes in a stage to the cathode of said second group in said same stage, said discharges then transferring to the first group cathodes of the next stage in said series on release of said positive and negative pulses.

3. A shift register circuit comprising a cold cathode stepping tube having a plurality of cathodes and a single anode common to said cathodes, said cathodes comprising a first and a second group alternately arranged in spatial series and each including preference means for the preferential transfer of a glow discharge in one direction along said series, each pair of cathodes in said series comprising a stage in the register circuit, means connected to at least a cathode of said first group for applying information pulses thereto to establish a pattern of independent discharges at the cathodes of said first group, means for shifting said pattern of independent discharges comprising means for substantially simultaneously applying to said first group of cathodes a positive pulse to extinguish discharges present at said cathodes of said first group and applying to said second group of cathodes a negative going pulse to transfer discharges priorly present at any of said first group cathodes to the next cathode of said second group in said series, said discharges then transferring to the next first group cathodes in said series on release of said positive and negative going pulses, and output means connected to at least another of said stages for the generation of an output signal on the establishment of a discharge at said another stage.

4. A shift register circuit comprising a cold cathode stepping tube having a plurality of stages of cathodes arranged in spatial series and a single anode common to said cathodes, said cathodes including preference means for the preferential transfer of a glow discharge in one direction along said row, means connected to each of said stages for applying information pulses thereto to establish a pattern of independent discharges at said stages, and means for shifting said pattern, said shifting means including means for substantially simultaneously applying positive and negative going pulses to selected cathodes of said stages to extinguish any discharges present at said stages and to establish discharges at the stages next adjacent those stages where a discharge had been extinguished on release of said positive and negative going pulses.

5. A shift register circuit comprising a cold cathode stepping tube having a plurality of cathodes and a single anode common to said cathodes, said cathodes comprising a first and a second group alternately arranged in spatial series and each including preference means for the preferential transfer of a glow discharge in one direction along said series, each pair of cathodes in said series comprising a stage in the register circuit, means connected to each of said first group cathodes for applying information pulses thereto to establish a pattern of independent discharges at said stages, means for shifting said pattern along said stages comprising means for substantially simultaneously applying to said first group of cathodes a positive pulse to extinguish discharges present at said cathodes of said first group and applying to said second group of cathodes a negative going pulse to transfer discharges priorly present at any of said first group of cathodes to the next cathode of said second group in said series, said discharges then transferring to the first group cathode of the next stage in said series on release of said positive and negative pulses, and output means connected to at least one of said stages for the generation of an output signal on the establishment of a discharge at said one stage.

6. In a shift register, a cold cathode tube having a plurality of cathodes in spatial series arrangement with preference means for preferential transfer of glow discharge along said series, and an anode common to said cathodes, first alternate ones of said cathodes electrically connected together to constitute a rest group and second alternate ones of said cathodes electrically connected together to constitute a transfer group, means normally biasing said rest group cathodes at a predetermined potential sufficient to sustain discharges simultaneously at said rest cathodes, means normally biasing said transfer group cathodes at a more positive potential than said rest group cathodes, said positive potential being sufficient to prevent discharges normally at said transfer group cathodes, means for introducing information pulses to one of said rest cathodes to establish a pattern of independent discharges at said rest cathodes, and means for shifting said independent discharges from cathodes of said rest group to the next rest cathodes in said series, said shifting means including means for substantially simultaneously removing the normal bias from said rest cathodes, applying a positive pulse to said rest cathodes, removing normal bias from said transfer cathodes, applying a negative going pulse to said transfer cathodes, and subsequently removing said pulses and restoring said normal biases.

7. In a shift register in accordance with claim 6, said cathode connected to said information pulsing means having a rectifier connected in series between said cathode and said biasing means therefor, and further comprising switch means connected to one of said transfer cathodes to permit control of the continuous circulation of said independent discharges.

8. A shift register circuit comprising a cold cathode stepping tube having a plurality of stages arranged in spatial series and anode means common to said cathodes, said stages comprising pairs of adjacent cathodes, said cathodes having preference means associated therewith for the transfer of a glow discharge preferentially in one direction along said series, means connected to at least one of said stages for applying information pulses thereto to establish a pattern of independent discharges at said stages, and means for shifting said pattern, said shifting means comprising means for applying a de-ionizing pulse to said stages and means for applying a negative going pulse to said stages substantially within the de-ionization time for said tube after said de-ionizing pulse to extinguish any discharges present at said stages and to establish discharges at the stages next adjacent those stages where a discharge had been extinguished on release of said positive and negative going pulses.

References Cited in the file of this patent

UNITED STATES PATENTS

| | | |
|---|---|---|
| 2,553,585 | Hough | May 22, 1951 |
| 2,557,370 | Townsend | Nov. 20, 1951 |
| 2,607,891 | Townsend | Aug. 19, 1952 |
| 2,608,674 | Depp | Aug. 26, 1952 |
| 2,635,810 | Townsend | Apr. 21, 1953 |